United States Patent
Nguyen

(10) Patent No.: US 10,871,259 B2
(45) Date of Patent: Dec. 22, 2020

(54) MOUNTING BRACKETS INCLUDING CLAMPS

(71) Applicant: HEWLETT PACKARD ENTERPRISE DEVELOPMENT LP, Houston, TX (US)

(72) Inventor: Tri Nguyen, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 25 days.

(21) Appl. No.: 16/369,305

(22) Filed: Mar. 29, 2019

(65) Prior Publication Data

US 2020/0309317 A1  Oct. 1, 2020

(51) Int. Cl.
*F16M 13/02* (2006.01)
*B23K 37/04* (2006.01)

(52) U.S. Cl.
CPC ....... *F16M 13/022* (2013.01); *B23K 37/0435* (2013.01); *F16M 2200/022* (2013.01); *F16M 2200/027* (2013.01); *F16M 2200/065* (2013.01); *F16M 2200/068* (2013.01)

(58) Field of Classification Search
CPC .......... F16M 13/022; F16M 2200/022; F16M 2200/027; F16M 2200/065; F16M 2200/068; F16M 11/041; B23K 37/0435; B25B 5/02; B25B 1/24; H01R 13/62; F16B 2/12; F16B 2/02
See application file for complete search history.

(56) References Cited

U.S. PATENT DOCUMENTS

| | | | | |
|---|---|---|---|---|
| 5,358,205 A | * | 10/1994 | Starkey | F16B 7/0493 248/220.21 |
| 5,567,117 A | * | 10/1996 | Gunn | F04D 25/088 248/222.52 |
| 8,403,280 B2 | | 3/2013 | Halverson | |
| 9,161,466 B2 | * | 10/2015 | Huang | H05K 5/0204 |
| 9,749,002 B1 | * | 8/2017 | Fan | H04M 1/04 |
| 1,001,848 A1 | | 7/2018 | Baird | |
| 2005/0045786 A1 | * | 3/2005 | Tupper | A01G 9/12 248/229.2 |
| 2017/0074691 A1 | | 3/2017 | Baird | |

FOREIGN PATENT DOCUMENTS

NO      996374     6/2001

OTHER PUBLICATIONS

"Mpow Car Phone Mount,cd Slot Car Phone Holder Universal Car Cradle Mount with Three-side Grips and One-touch Design for Iphone X/8/8plus/7/7plus/6s/6p/5s, Galaxy S5/s6/s7/s8, Google, Huawei Etc," Amazon, Retrieved from Internet on Nov. 3, 2018, <https://www.amazon.com/Mpow-Holder-Universal-Three-Side-One-Touch/dp/B06XHT9ZP4> (4 pages).

* cited by examiner

*Primary Examiner* — Anita M King
(74) *Attorney, Agent, or Firm* — Trop, Pruner & Hu, P.C.

(57) ABSTRACT

In some examples, a mounting bracket includes a device clamp assembly having engagement members moveable with respect to one another to engage discrete corresponding engagement members of a device. The mounting bracket further includes a support clamp assembly comprising engagement members to engage a support structure to which the device is to mount.

14 Claims, 9 Drawing Sheets

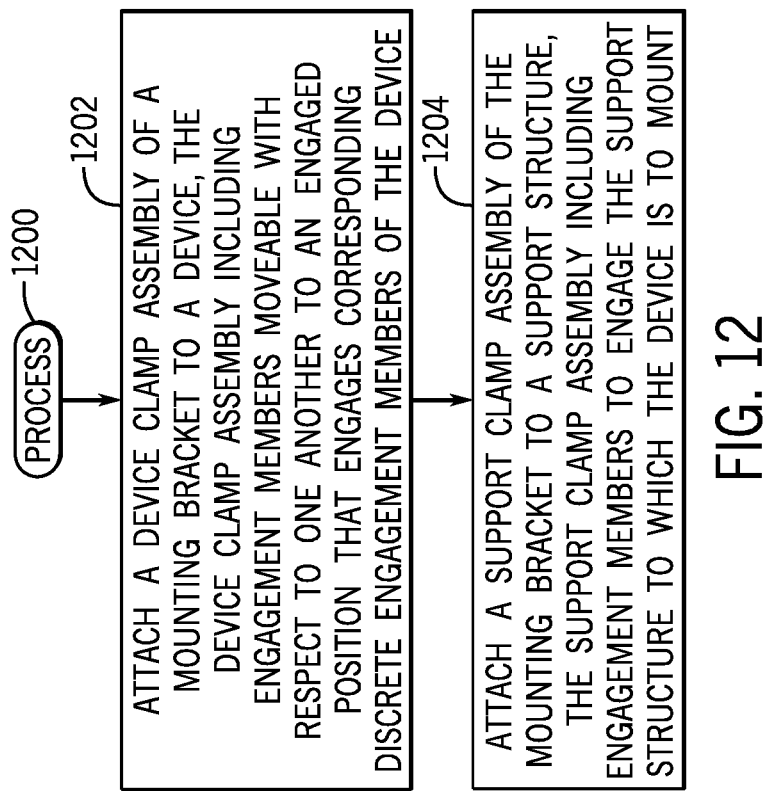
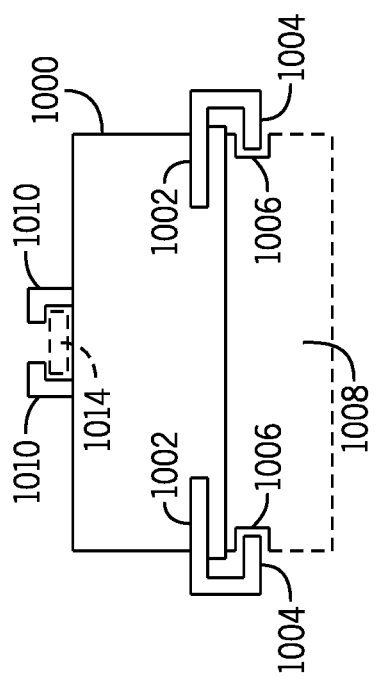
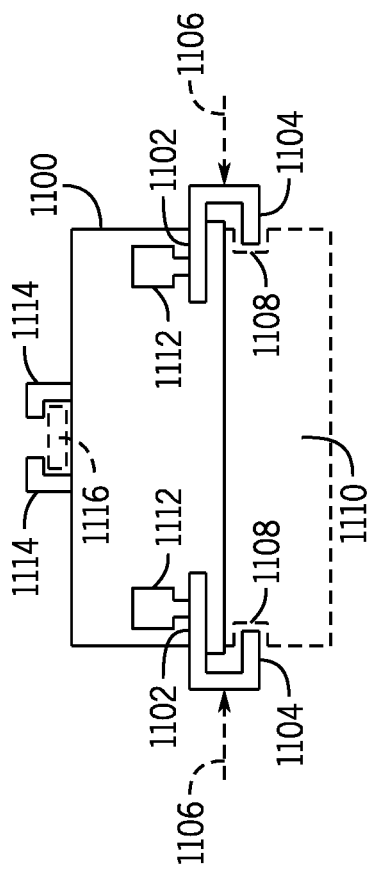

MOUNTING BRACKETS INCLUDING CLAMPS

BACKGROUND

Electronic devices can be placed in various locations. For example, electronic devices can include sensors to measure conditions of an environment, transmission devices to transmit signals, sensors to detect presence of objects, cameras to capture images, control devices to control systems, and so forth.

BRIEF DESCRIPTION OF THE DRAWINGS

Some implementations of the present disclosure are described with respect to the following figures.

FIGS. 10 and 11 are schematic views of mounting brackets according to various examples.

FIG. 12 is a flow diagram of a process according to some examples.

Figure 1:
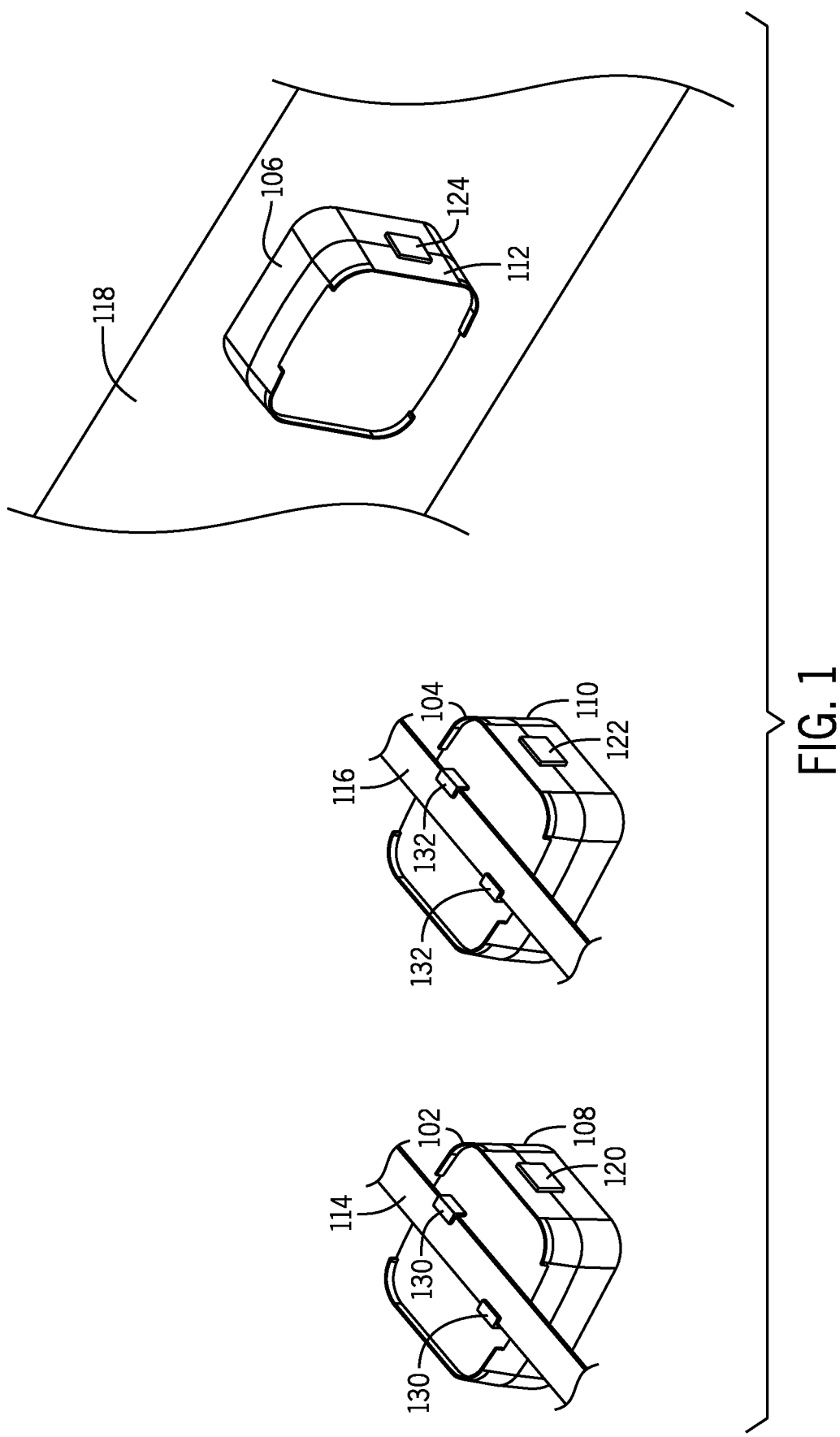
FIG. 1 is a schematic diagram of an arrangement that includes mounting brackets used for mounting electronic devices to corresponding support structures, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An enterprise (e.g., an individual, a company, an educational organization, a government agency, etc.) may deploy a large number of electronic devices across a location or across multiple locations. Mounting such electronic devices to support structures such as walls, beams, ceiling rails, and so forth, can be time-consuming, especially if tools are to be used to attach the electronic devices to the support structures.

In addition, if different types of mounting brackets are used to mount electronic devices to different types of support structures (e.g., ceiling rails of different thicknesses, walls, etc.), then the enterprise may have to keep a relatively large number of different types of mounting brackets available to make them available for mounting electronic devices to the different types of support structures. Keeping a large number of mounting brackets around may be costly for the enterprise. Moreover, users have to be trained to use the different types of mounting brackets, which may increase labor cost.

In accordance with some implementations of the present disclosure, a mounting bracket includes engagement members that can be moved based on a toolless user-applied force. The engagement members of the mounting bracket can engage a device (e.g., an electronic device) and/or a support structure to which the device is to mount. "Toolless user-applied force" can refer to a force applied by a user's fingers, hands, etc., without the use of any tool. The user can directly engage engagement surfaces of the engagement members of the mounting bracket to move the engagement members from a released position to an engaged position.

FIG. 1 illustrates an example arrangement that includes various mounting brackets 102, 104, and 106, to attach respective electronic devices 108, 110, and 112 to corresponding support structures 114, 116, and 118. The support structures 114 and 116 are ceiling rails located at a ceiling of a building, a home, a warehouse, or any other type of facility. The support structure 118 is a wall. In other examples, mounting brackets can be used to attach electronic devices to other types of support structures.

Examples of electronic devices 108, 110, and 112 include any or some combination of the following: transmission devices to transmit signals (e.g., Bluetooth beacons, access points, wireless access network nodes, etc.), sensors to detect presence of objects, cameras to capture images, control devices to control systems, and so forth.

Figure 2:
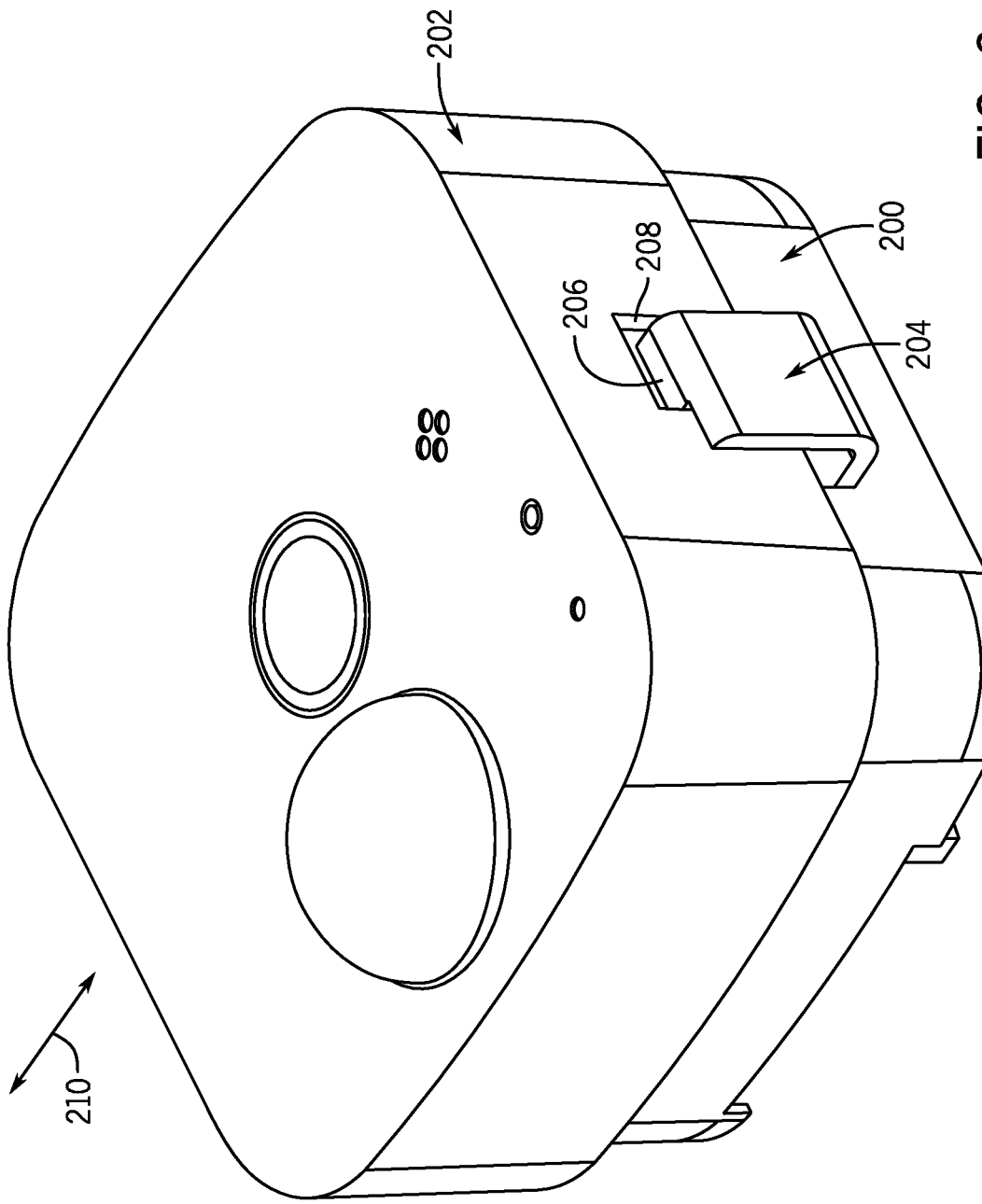
FIG. 2 is an upside-down perspective view of an assembly of a mounting bracket attached to an electronic device, in accordance with some examples.

Referring further to FIG. 2, an enlarged perspective view of an assembly that includes a mounting bracket 200 and an electronic device 202 is shown. In FIG. 2, the assembly is shown in an upside-down orientation (as compared to an orientation of the assembly when the mounting bracket is attached to a ceiling rail, for example). The electronic device 202 can be any of the electronic devices 108, 110, and 112, and the mounting bracket 200 can be any of the mounting brackets 102, 104, and 106.

The mounting bracket 200 has a moveable clamp 204 with an inwardly protruding engagement tab 206 that is received in an engagement slot 208 in the housing of the electronic device 202. Once the engagement tab 206 is received in the engagement slot 208, the electronic device 202 is fixedly attached to the mounting bracket 200. Although not visible in FIG. 2, the mounting bracket 200 includes another inwardly protruding engagement tab (similar to 206) on another side of the mounting bracket 200, to engage a corresponding engagement slot in the housing of the electronic device 202.

The clamp 204 is moveable along an axis 210 between a released position and an engaged position. The engaged position is shown in FIG. 2, in which the engagement tab 206 is engaged in the engagement slot 208. In the released position, the engagement tab 206 is disengaged from the engagement slot 208.

In other examples, the engagement slot 208 of the housing of the electronic device 202 can be replaced with a protruding tab, and the clamp 204 can have an engagement slot to receive the protruding tab of the electronic device housing when the clamp 204 is in the engaged position.

More generally, the clamp 204 has a first engagement member and the electronic device housing has a second engagement member that engages with the first engagement member to lock the electronic device 202 with respect to the mounting bracket 200 when the clamp 204 is in the engaged position, and the first and second engagement members are released from one another to allow the electronic device 202 to be removed from the mounting bracket 200 when the clamp 204 is in the released position.

As shown in FIG. 1, the mounting bracket 102 has a clamp 120 to lock the electronic device 108 with respect to the mounting bracket 102, the mounting bracket 104 has a clamp 122 to lock the electronic device 110 with respect to the mounting bracket 104, and the mounting bracket 106 has a clamp 124 to lock the electronic device 112 with respect to the mounting bracket 106.

As further shown in FIG. 1, the mounting bracket 102 has support locking members 130 to engage the ceiling rail 114 to hold the mounting bracket 102 with respect to a ceiling rail 114. Similarly, the mounting bracket 104 has locking members 132 to engage the ceiling rail 116.

The mounting bracket 106 is engaged with the wall 118 using a different attachment mechanism, such as screws or other fasteners, as discussed further below.

Figure 3:
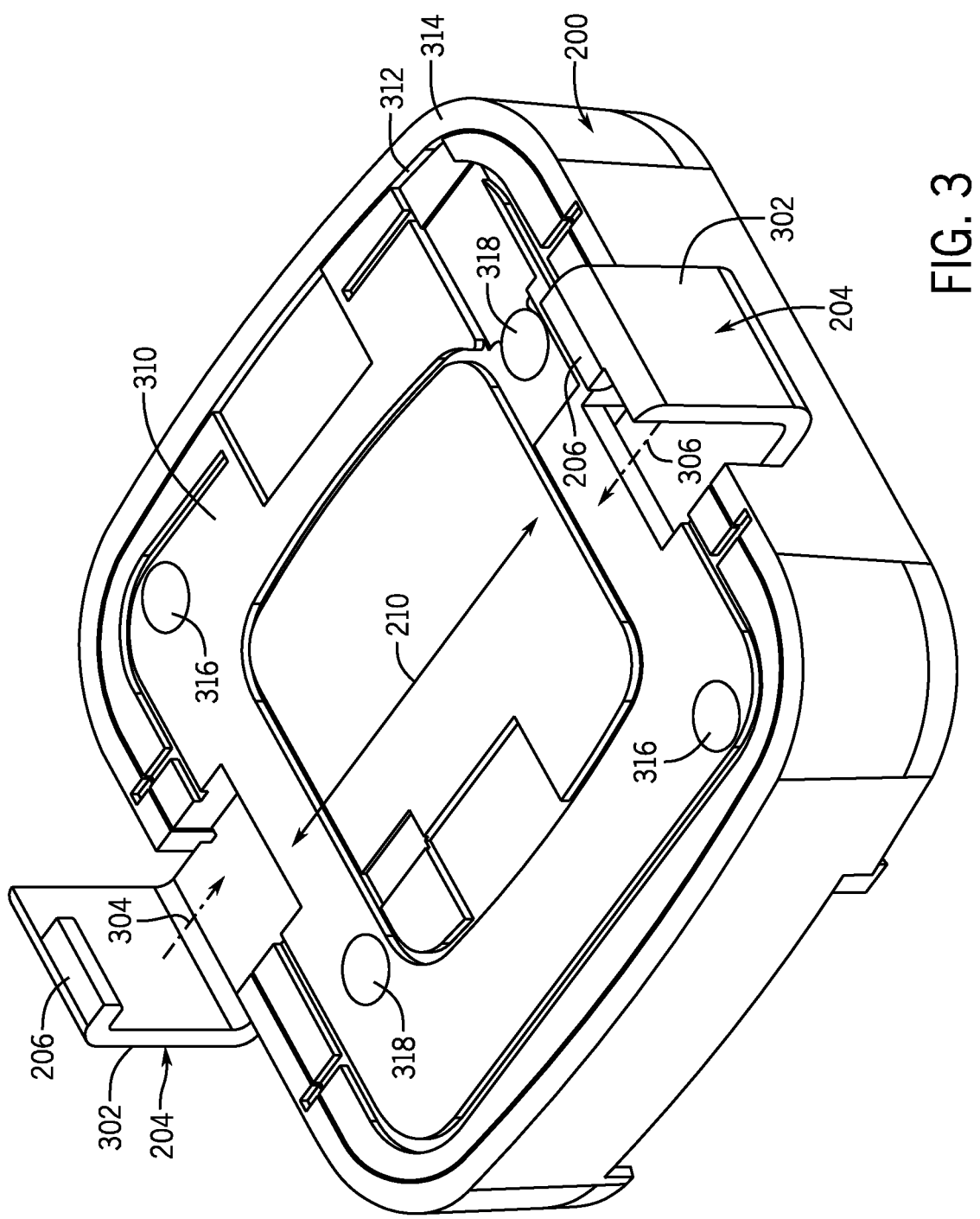
FIG. 3 is perspective view of a mounting bracket with the electronic device removed, according to some examples.

FIG. 3 is a perspective view of the mounting bracket 200 (in an upside-down orientation) with the electronic device 202 of FIG. 2 removed from the mounting bracket 200 after the clamps 204 of the mounting bracket 200 have been actuated to their released position (the position shown in FIG. 3), to disengage respective engagement tabs 206 of the corresponding clamps 204 from the respective engagement slots 208 of the electronic device 202.

In some examples, it is assumed that, unless specified otherwise in this description, the components of the mounting bracket 200, including a housing 314 of the mounting bracket 200, a cover 310, the clamps 204, and components inside the mounting bracket 200 (further shown in FIG. 4) are formed of a plastic. In other examples, any of the various components of the mounting bracket 200 can be formed of a different material, such as a metal, and so forth. Different components can be formed of different materials in further examples.

The clamps 204 are moveable along the axis 210. In response to user actuation, by the user's fingers applying opposing forces against engagement surfaces 302 of the corresponding clamps 204, the clamps are moved inwardly (as indicated by arrows 304 and 306 along the axis 210) from the released position to the engaged position. The inward directions 304 and 306 are opposite one another.

FIG. 3 also shows a cover 310 of the mounting bracket 200 that is received in an inner chamber 312 of the mounting bracket 200. The inner chamber 312 is defined by the housing 314 of the mounting bracket 200.

In some examples, the cover 310 has bracket attachment through-holes 316 through which screws or other fasteners (shown in FIG. 4) can be provided to attach the cover 310 to the mounting bracket housing 314 (discussed further in connection with FIG. 4 below).

The cover 310 also has wall attachment through-holes 318 through which screws or other fasteners can extend to attach the mounting bracket 200 to a wall, such as the wall 118 of FIG. 1.

Figure 4:
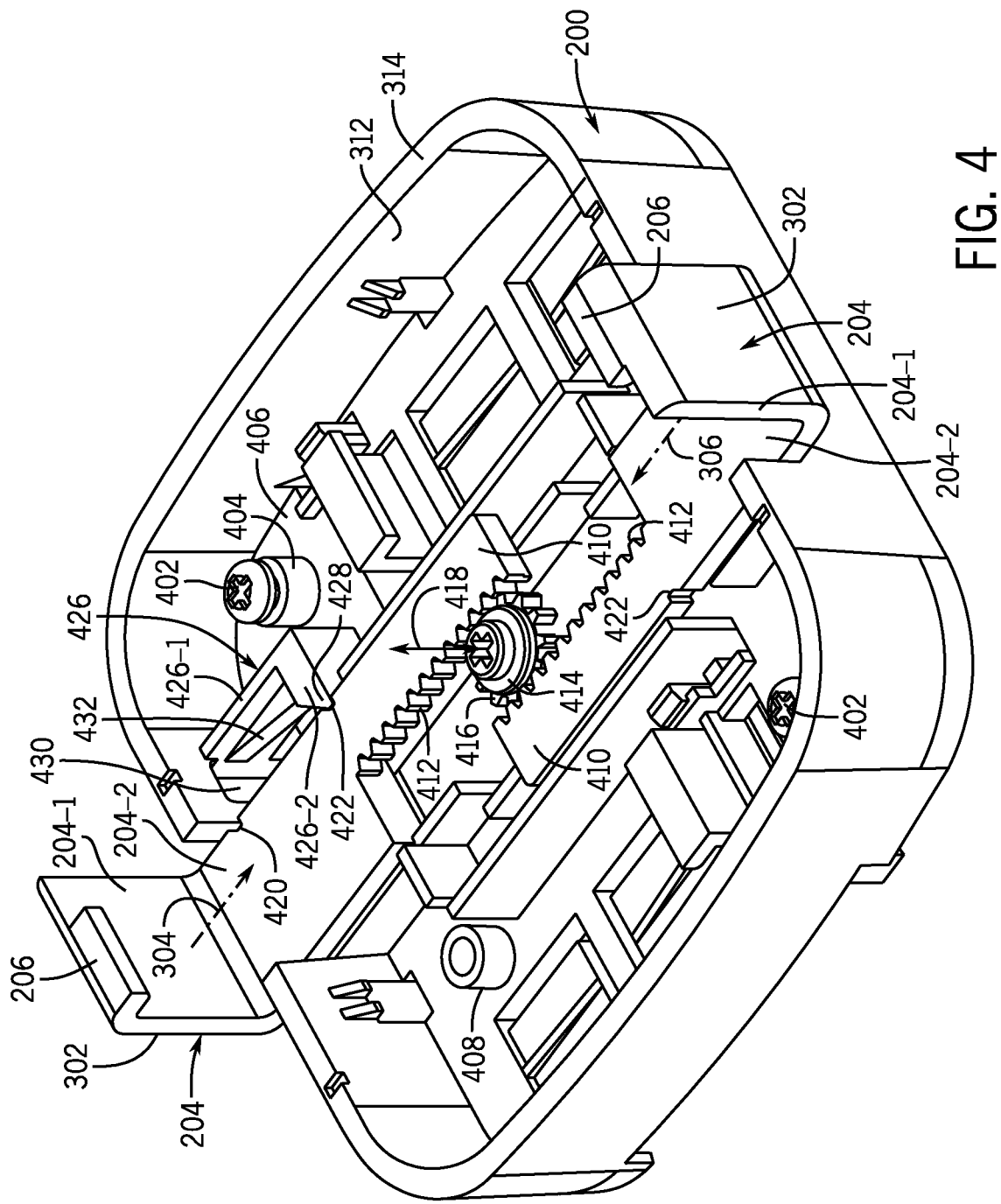
FIG. 4 is a perspective view of a mounting bracket with a cover removed, according to some examples.

FIG. 4 is a perspective view of the mounting bracket 200 with the cover 310 of FIG. 3 removed (shown in an upside-down orientation). In FIG. 4, screws 402 (or other types of fasteners) are depicted as being engaged in respective attachment bosses 404 (only one shown in FIG. 4) that extend from an inner surface 406 of the mounting bracket housing 314. The screws 402 can be formed of a metal or other material. The screws 402 are shown engaged in the attachment bosses 404 for illustration. In actual use, the screws 402 would extend through the bracket attachment through-holes 316 (FIG. 3), to engage the attachment bosses 404, such as by threading, using a screwdriver, the screws 402 into the attachment bosses 404.

FIG. 4 also shows a mounting boss 408 that extends from the inner surface 406 of the mounting bracket housing 314. Another corresponding mounting boss 408 is provided in the other corner of the inner chamber 312 of the mounting bracket 200, where the other corner is diagonally across the mounting boss 408 shown in FIG. 4. Although not shown, a screw or other fastener can be used to extend through the mounting bosses 408 of the mounting bracket 200 to attach the mounting bracket 200 to a wall, such as the wall 118 of FIG. 1.

In other examples, a different type of fastener can be used to extend through each mounting boss 408 to attach the mounting bracket 200 to a wall.

As shown in FIG. 4, each clamp 204 has a vertical clamp segment 204-1 and a horizontal clamp segment 204-2. Although referred to as "vertical" and "horizontal" clamp segments, the clamp segments 204-1 and 204-2 can have other orientations in other examples.

The engagement tab 206 is attached to and protrudes inwardly from the upper end of the vertical clamp segment 204-1. The horizontal clamp segment 204-2 is generally perpendicular to the vertical clamp segment 204-1, and extends from the vertical clamp segment 204-1 into the inner chamber 312 of the mounting bracket housing 314. The vertical clamp segment 204-1 and the horizontal clamp segment 204-2 can be integrally formed (from a single piece of material), or alternatively, the vertical clamp segment 204-1 and the horizontal clamp segment 204-2 can be separate segments that are attached to or bonded to one another.

Each horizontal clamp segment 204-2 includes a ratchet 410 that extends towards a center of the inner space 312 of the mounting bracket housing 314. Each ratchet 410 has teeth 412 that face inwardly toward a gear 414 that has corresponding mating teeth 416 to engage with the teeth 412 of the ratchets 410 of the clamps 204.

The gear 414 is rotatable with respect to a rotation axis 418 of the gear 414. When a user presses inwardly on engagement surfaces 302 of the clamps 204, the horizontal clamp segments 204-2 are moved in respective inward directions 304 and 306. This inward linear motion of the ratchets 410 (along directions 304 and 306) causes rotation of the gear 414 in a clockwise direction about the rotation axis 418 due to engagement of the teeth 416 of the gear 414 with the teeth 412 of the ratchets 410.

In other examples, instead of using the ratchets 410 and the gear 414, other types of mechanisms to allow for linear motion of the clamps 204 in response to user actuation can be employed.

The horizontal clamp segment 204-2 has locking grooves 420 and 422. Although two locking grooves are shown in FIG. 4, it is noted that in a different example, a different number (1 or greater than 2) of locking grooves can be provided along the horizontal clamp segment 204-2.

The locking grooves 420 and 422 correspond to two different engaged positions of each clamp 204. When a locking tab 428 is engaged with the locking groove 422, as shown in FIG. 4, the clamp 204 is at a first engaged position, to accommodate an electronic device of a first size. To accommodate an electronic device of a second size (smaller than the first size), the clamp 204 can be pushed further inwardly (along direction 304 or 306) to cause the locking tab 428 to engage the locking groove 420, which corresponds to a second engaged position of the clamp 204.

The locking tab 428 forms an end portion of a clamp lock 426. The clamp lock 426 generally has a reverse L-shape, and includes an attachment clamp lock segment 426-1 that is attached to the mounting bracket housing 314, and an engagement clamp lock segment 426-2 that includes the locking tab 428.

The clamp lock 426 can be formed of a flexible material (e.g., plastic or another type of flexible material) that has a biasing force to bias the locking tab 424 in the locking groove 420 or 422. As discussed further below, the flexible nature of the clamp lock 426 allows a user to disengage the locking tab 428 from the locking groove 420 or 422, to allow unlocking of the respective clamp 204 such that the respective clamp 204 can be moved in an outward direction opposite the inward direction 304 or 306.

Figure 5:
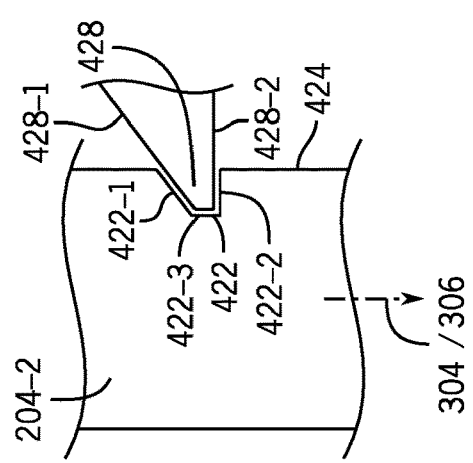
FIG. 5 is an enlarged view of a portion of a segment of a clamp and a portion of a clamp lock, according to some examples.

FIG. 5 shows an enlarged view of the locking groove 422 formed in the horizontal clamp segment 204-2. The locking groove 420 has a similar profile.

The locking groove 422 has a sloped side 422-1 and a non-sloped side 422-2. An inner edge 422-3 connects the sloped side 422-1 and the non-sloped side 422-2. The sloped side 422-1 is sloped with respect to a side edge 424 of the horizontal clamp segment 204-2, while the non-sloped side 422-2 is generally perpendicular with respect to the side edge 424. The side edge 424 can extend along a direction that is generally parallel to the direction 304 or 306.

The locking tab 424 has a corresponding sloped surface 428-1 that engages the sloped side 422-1 of the locking groove 422 when the locking tab 428 is engaged in the locking groove 422. The locking tab 428 further has a non-sloped surface 428-2 to engage the non-sloped side 422-2 of the locking groove 422 when the locking tab 428 is engaged inside the locking groove 422.

The sloped surface 428-1 is sloped with respect to the side edge 424 of the horizontal clamp segment 204-2, and the non-sloped surface 428-2 is generally perpendicular to the side edge 424.

The sloped side 422-1 of the locking groove 422 and the corresponding sloped surface 428-1 of the locking tab 424 allows the locking tab 424 to rise out of the locking groove 422 as the horizontal clamp segment 204-2 moves in the inward direction 304 or 306. As the horizontal clamp segment 204-2 moves along inward direction 304 or 306, the sloped side 422-1 of the locking groove 422 can apply an outward force against the sloped surface 428-1 of the locking tab 428 to push the locking tab 428 out of the locking groove 422 as the horizontal clamp segment 204-2 moves in the inward direction.

However, the engagement between the non-sloped surface 428-2 of the locking tab 428 and the non-sloped side 422-2 of the locking groove 422 would prevent movement of the horizontal clamp segment 204-2 in an outward direction opposite the inward direction 304 or 306. In this manner, once the clamp 204 has been pushed inwardly by the user to cause movement along the inward direction 304, and the locking tab 428 has engaged the locking groove 422, the locking tab 428 effectively locks the clamp 204 to prevent disengagement caused by movement of the clamp 204 in the outward direction. Thus, once the clamp 204 is engaged with an electronic device to lock the electronic device to the mounting bracket 200 in the first engaged position (corresponding to the locking groove 422) or the second engaged position (corresponding to the locking groove 420), inadvertent release of the clamp 204 can be prevented.

As further shown in FIG. 4, to disengage the clamp lock 426 from the locking groove 422 or 420 of the clamp 204, an unlock key, such as a screwdriver, a pin, a paper clip, or other similar tool, can be inserted through a side opening 430 in the mounting bracket housing 314. The unlock key extends through the side opening 430 to engage a disengagement ramp surface 432 of the clamp lock 426. The disengagement ramp surface 432 is slanted such that continued insertion of the unlock key that rides along the disengagement ramp surface 432 causes a force to be applied that pushes the locking tab 428 away from the locking groove 420 or 422.

The locking tab 428 away from the locking groove 420 or 422 disengages the lock clamp 426 from the locking groove 420 or 422, so that the clamp 204 is released and can be moved in an outward direction (opposite the inward direction 304 or 306) to disengage the clamp 204 from the electronic device 202 mounted to the mounting bracket 200.

Figure 6:
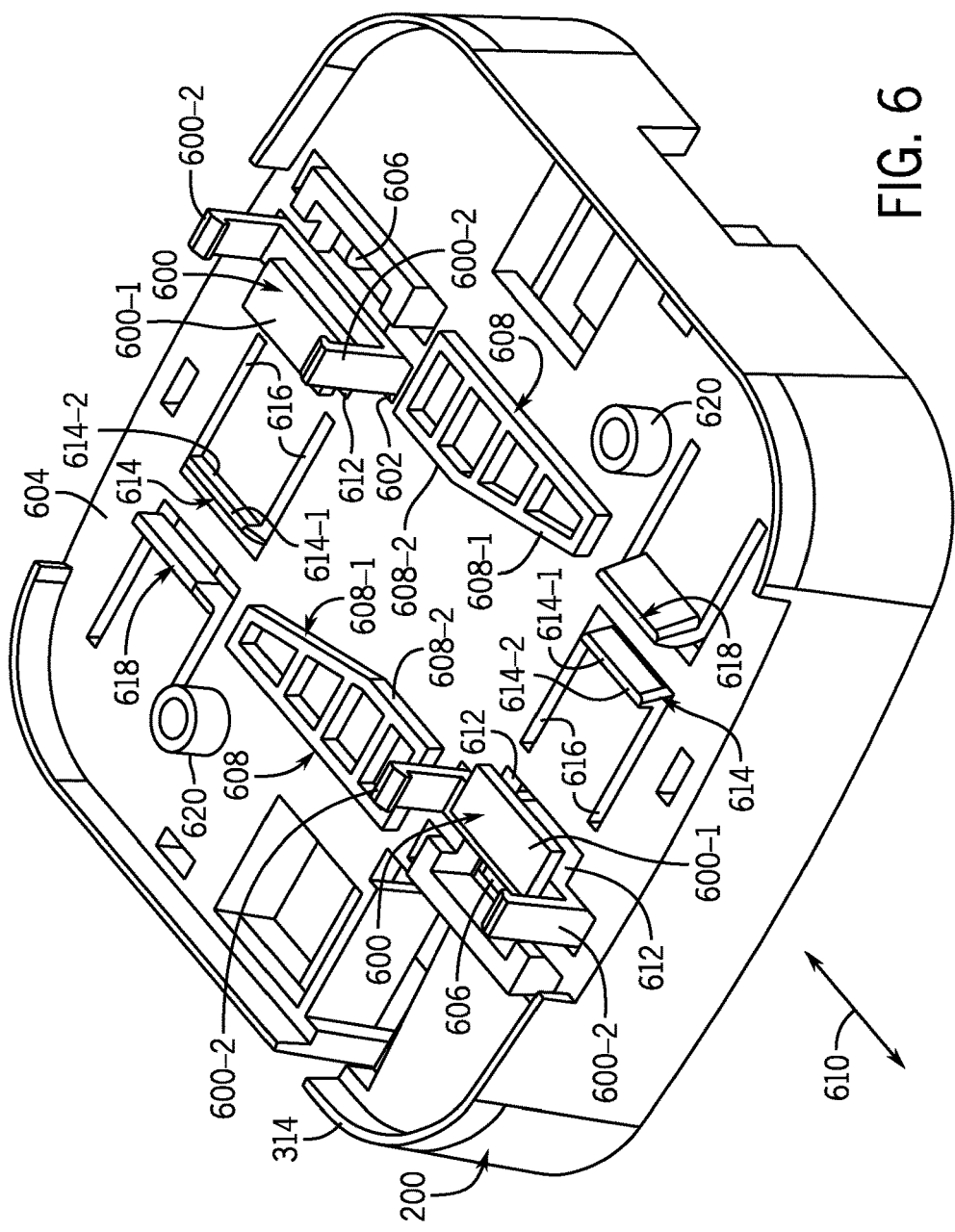
FIG. 6 is a perspective view of upper portion of a mounting bracket according to some examples.

FIG. 6 is a perspective view of an upper surface of the mounting bracket 200 (the orientation shown in FIG. 6 is flipped from the orientation depicted in FIG. 4). Support clamps 600 are engaged in respective engagement openings 602 of an outer surface 604 of the mounting bracket housing 314. The support clamps 600 are examples of the support clamps 130 or 132 in FIG. 1.

Once the support clamps 600 are engaged in the engagement openings 602, bottom portions of the support clamps 600 are locked in place, so that the support clamps 600 do not disengage from the mounting bracket 200 (unless forcibly disengaged such as with a tool).

In some examples, the support clamps 600 are placed in the engagement opening 602 to accommodate a ceiling rail of a first width. To accommodate a ceiling rail of a second width greater than the first width, the support clamps can be placed in engagement openings 606.

Guide structures 608 are also provided on the upper surface 604 of the mounting bracket housing 314. The guide structures 608 have engagement surfaces to engage sides of a ceiling rail or other type of support structure. The engagement surfaces of each guide structure includes an angled engagement surface 608-1 and an aligned engagement surface 608-2. The angled engagement surface 608-1 has a non-zero angle with respect to the aligned engagement surface 608-2. The aligned engagement surface 608-2 extends along an axis that is generally parallel to a width of each support clamp 600, generally along a width axis 610.

Figure 7:
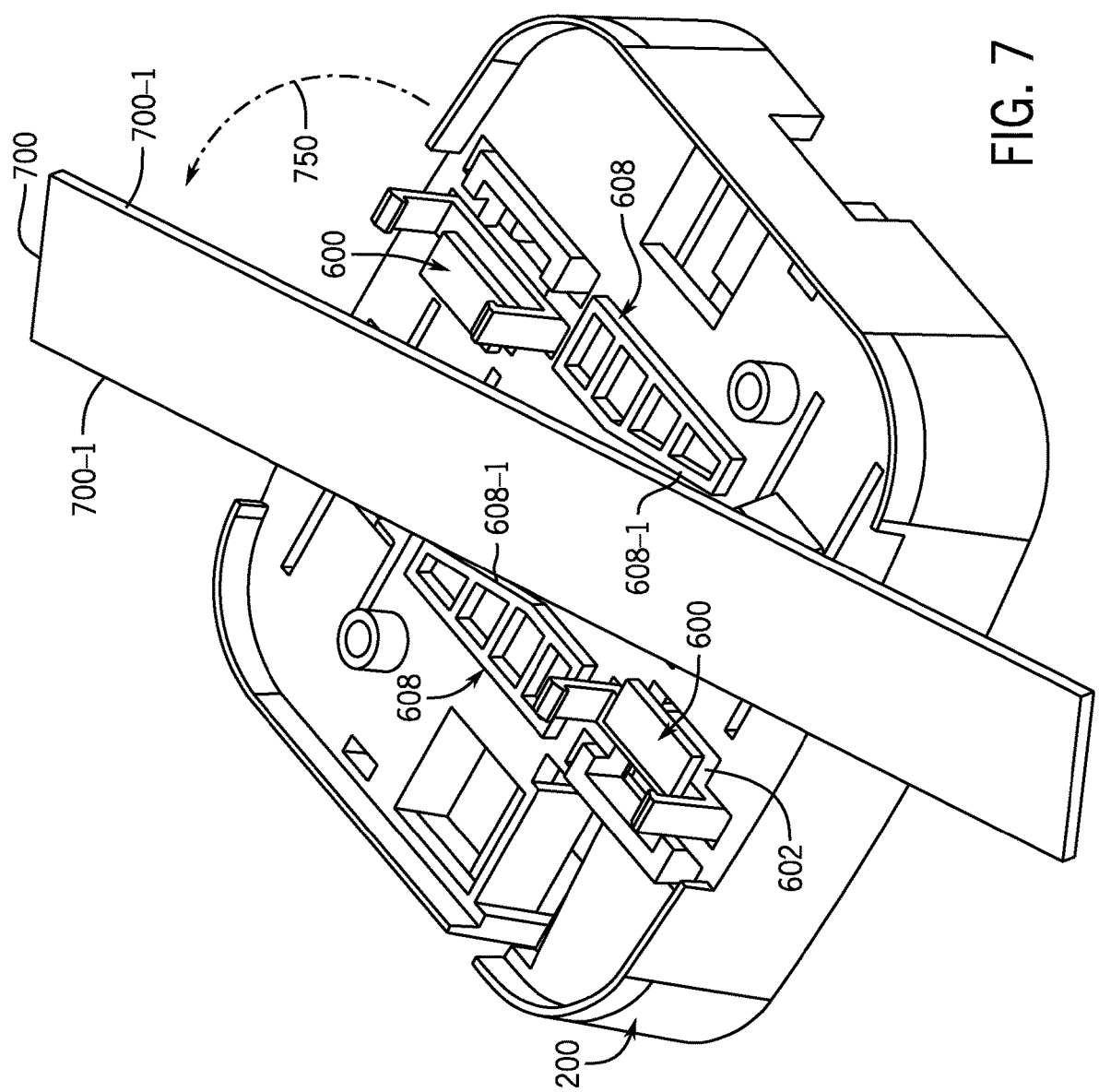
FIGS. 7 and 8 are perspective views of a mounting bracket being attached to a ceiling rail, in accordance with some examples.

As further shown in FIG. 7, to mount the mounting bracket 200 to a ceiling rail 700, the mounting bracket 200 is rotated with respect to the ceiling rail 700 such that the side edges 700-1 of the ceiling rail 700 sits between and touches the angled engagement surfaces 608-1 of the guide structures 608. In this initial engaged position between the guide structures 608 and the ceiling rail 700, the ceiling rail 700 extends along a direction that is angled (non-zero angle) with respect to the width axis 610 of each support clamp 600. Once the mounting bracket 200 is positioned with respect to the ceiling rail 700 such that the ceiling rail 700 sits between the angled engagement surfaces 608-1 of the guide structure 608, the mounting bracket 200 can be rotated in a counterclockwise direction (750) to position the mounting bracket 200 such that the side edges 700-1 of the ceiling rail 700 sits between and touches the aligned engagement surfaces 608-2 of the guide structures 608, as shown in FIG. 8.

Figure 8:
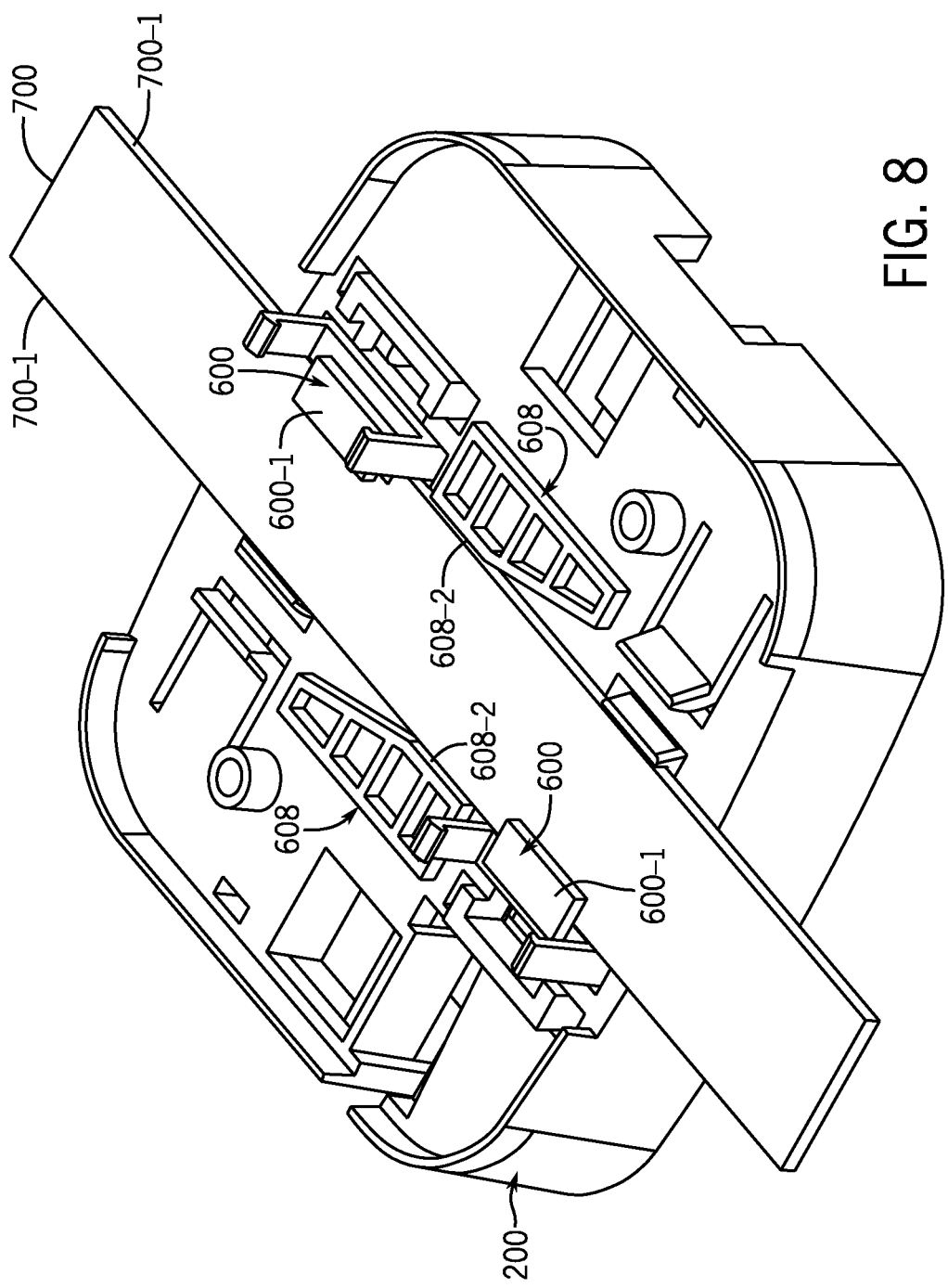

As shown in FIGS. 6 and 8, each support clamp 600 has an engagement tab 600-1 that sits between support towers 600-2. The user can grip the support tower 600-2 to push the support clamp 600 into the engagement opening 602 of the mounting bracket housing 314.

Figure 9:
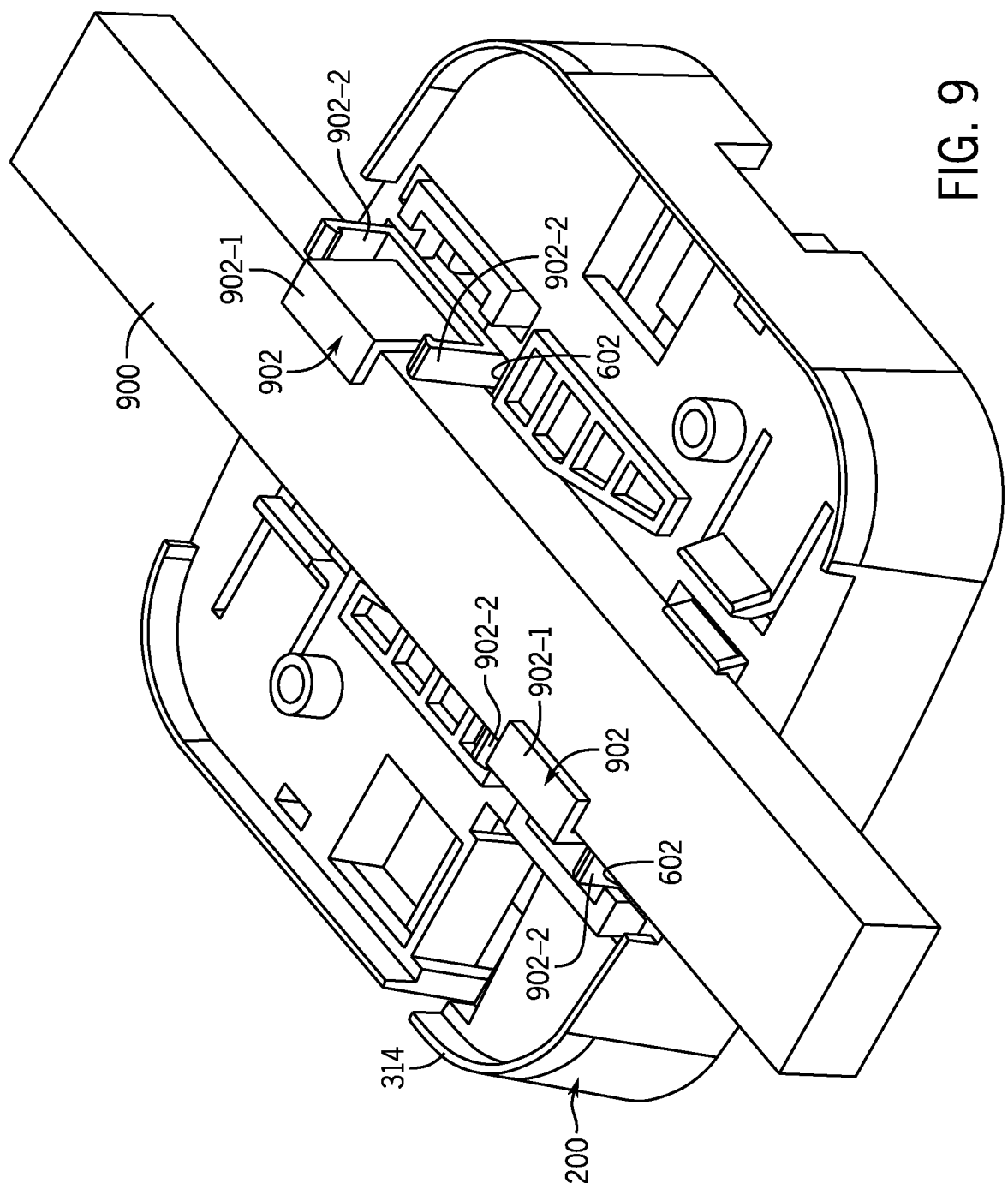
FIG. 9 is a perspective view of a mounting bracket engaged with a ceiling rail of a different thickness, according to further examples.

Each support clamp 600 can be flipped over, such that the support towers 600-2 can be pushed into the engagement opening 602. The support towers 600-2 when pushed into the engagement opening 602 can engage a locking profile in the engagement opening 602 to lock the support clamp 600 in place (as shown in FIG. 9).

An engagement gap 612 is provided between the bottom surface of the engagement tab 600-1 and the upper surface 604 of the mounting bracket housing 314. When the mounting bracket is rotated with respect to the ceiling rail 700 from the position shown in FIG. 7 to the position shown in FIG. 8, the ceiling rail 700 slides under the engagement tabs 600-1 to fit in respective engagement gaps 612, as shown in FIG. 8. Once the ceiling rail 700 slides into the engagement gaps 612, the engagement tabs 600-1 can hold the ceiling rail 700 in position, which effectively mounts the mounting bracket 200 to the ceiling rail 700.

As further shown in FIG. 6, a cantilevered ceiling rail lock 614 is pivotably connected to the mounting bracket housing 314. The ceiling rail lock 614 can be formed of a flexible material (e.g., plastic or another type of flexible material) that has a biasing force to bias the ceiling rail lock 614 upwardly such that a protruding part 614-1 of the ceiling rail lock 614 protrudes above the upper surface 604 of the mounting bracket housing 314.

When the mounting bracket 200 is engaged to the ceiling rail 700 in the position shown in FIG. 7, the bottom surface of the ceiling rail 700 pushes the protruding part 614-1 of the ceiling rail lock 614 downwardly such that the tip of the protruding part 614-1 is level with the upper surface 604 of the mounting bracket housing 314. Arms (not shown) of the ceiling rail lock 614 attached to the protruding part 614-2 can swivel in channels 616 formed in the upper surface 604 of the mounting bracket housing 314.

After the mounting bracket 200 is rotated to cause the ceiling rail 700 to fit under the engagement gaps 602 of the engagement tabs 600-1, the protruding part 614-1 of the ceiling rail locks 614 can swivel back up above the upper surface 604, such that the side edges 700-1 of the ceiling rail 700 are engaged against engagement surfaces 614-2 of the ceiling rail locks 614. In the position shown in FIG. 8, the mounting bracket 200 is securely attached to the ceiling rail 700 by the support clamps 600 and the ceiling rail locks 614.

Further ceiling rail locks 618 that are spaced apart from one another by a greater width (than the ceiling rail locks 614) are also provided to accommodate the ceiling rail of a larger width, when engaged with support clamps 600 mounted in the engagement openings 606.

As further shown in FIG. 6, mounting bosses 620 are provided above the upper surface 604 of the mounting brackets 314. The mounting bosses 620 can engage a wall, such that screws or other fasteners passed through the mounting bosses 408 from the inner chamber 312 of the mounting bracket housing 314 can penetrate the wall to attach the mounting bracket 200 to the wall.

FIG. 9 is a perspective view of the mounting bracket 200 engaged to a ceiling rail 900 of a different thickness, where the thickness of the ceiling rail 900 is larger than the thickness of the ceiling rail 700 of FIG. 8. To accommodate the increased thickness of the ceiling rail 900, different support clamps 902 can be provided. Note that the support clamps 902 can be on the opposite end of the support clamps 600 shown in FIG. 6. Thus, to accommodate ceiling rails of different thicknesses, different ends of the support clamps can be inserted into the respective engagement openings 602 of the mounting bracket housing 314.

Each support clamp 902 has an engagement tab 902-1 that sits between support towers 902-2. In the arrangement shown in FIG. 9, the support towers 600-2 shown in FIG. 6 have been pushed into an engagement opening 602 such that the support towers 600-2 are locked in the engagement opening 602.

In the arrangement of FIG. 6, the support towers 902-2 have been pushed into an engagement opening 602 such that the support towers 902-2 are locked in the engagement opening 602.

FIG. 10 is a schematic diagram of a mounting bracket 1000 that includes a device clamp assembly 1002 that has engagement members 1004 moveable with respect to one another to engage discrete corresponding engagement members 1006 of a device 1008. For example, the device clamp assembly 1002 can include the clamps 204 of FIGS. 2 and 3. The engagement members 1006 of the device 1008 can include the engagement slots 208 of the electronic device 202 shown in FIG. 2, for example.

The mounting bracket 1000 further includes a support clamp assembly 1010 having engagement members 1012 to engage a support structure 1014 to which the device 1008 is to mount. For example, the support clamp assembly 1010 can include the support clamps 600 or 902 of FIG. 6 or 9.

FIG. 11 is a schematic diagram of a mounting bracket 1100 according to further examples. The mounting bracket 1100 includes device clamps 1102 having engagement members 1104 moveable inwardly toward one another responsive to toolless user-applied forces 1106 to engage corresponding engagement members 1108 of a device 1110.

The mounting bracket 1100 further includes clamp locks 1112 to lock the device clamps 1102 in position after the device clamps 1102 are engaged to the device 1110. The clamp locks 1112 can be the clamp locks 426 of FIG. 4, for example.

The mounting bracket 1100 further includes a support clamp assembly 1114 having engagement members to engage a support structure 1116 to which the device 1110 is to mount.

FIG. 12 is a flow diagram of a process 1200 according to some examples. The process 1200 includes attaching (at 1202) a device clamp assembly of a mounting bracket to a device, the device clamp assembly including engagement members moveable with respect to one another to an engaged position that engages corresponding discrete engagement members of the device.

The process 1200 further includes attaching (at 1204) a support clamp assembly of the mounting bracket to a support structure, the support clamp assembly including engagement members to engage the support structure to which the device is to mount.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A mounting bracket comprising:
a device clamp assembly comprising engagement members moveable with respect to one another to engage discrete corresponding engagement members of a device;
a support clamp assembly comprising engagement members to engage a support structure to which the device is to mount;
a first ratchet coupled to a first engagement member of the engagement members of the device clamp assembly, the first ratchet comprising teeth and moveable with respect to mating teeth of a rotatable gear to allow movement of the first engagement member respective to a user-applied force; and
a clamp lock to lock the first ratchet in position after the engagement members of the device clamp assembly are engaged with the discrete corresponding engagement members of the device, wherein the clamp lock comprises a ramped disengagement surface engageable by an unlock key to release the clamp lock from the first ratchet to allow disengagement of the first engagement member of the device clamp from a respective engagement member of the device.

2. The mounting bracket of claim 1, further comprising a second ratchet coupled to a second engagement member of the engagement members of the device clamp assembly, the second ratchet comprising teeth and moveable with respect to the mating teeth of the rotatable gear to allow movement of the second engagement member responsive to a user-applied force,
wherein the first ratchet and the second ratchet are moveable in opposite directions to allow the first engagement member and the second engagement member to move toward one another to engage the discrete engagement members of the device.

3. The mounting bracket of claim 1, wherein the engagement members of the device clamp assembly comprise engagement surfaces against which user-applied forces are applied.

4. The mounting bracket of claim 1, wherein the device clamp assembly comprises a first device clamp comprising the first engagement member of the engagement members, and a second device clamp comprising a second engagement member of the engagement members, and
wherein the first ratchet is part of a segment of the first device clamp, the segment comprising a locking groove to engage a locking tab of the clamp lock.

5. The mounting bracket of claim 1, wherein the support clamp assembly comprises support clamps to engage the support structure.

6. The mounting bracket of claim 5, further comprising:
guide structures, each guide structure of the guide structures comprising an angled engagement surface and an aligned engagement surface,
wherein the angled engagement surfaces of the guide structures are engaged to sides of the support structure when the mounting bracket is initially engaged to the support structure, and
wherein the mounting bracket is rotatable with respect to the support structure after the initial engagement to cause the sides of the support structure to engage the aligned engagement surfaces of the guide structures, and to engage the support structure to engagement tabs of the support clamps.

7. The mounting bracket of claim 6, further comprising:
cantilevered locks that are pushed down into a surface of the mounting bracket when the mounting bracket is initially engaged to the support structure, and that are raised above the surface after the mounting bracket is rotated with respect to the support structure to cause the support structure to engage the aligned engagement surfaces of the guide structures, the cantilevered locks when raised above the surface to engage the sides of the support structure.

8. The mounting bracket of claim 5, comprising:
first engagement openings to receive the support clamps to accommodate the support structure of a first width, and
second engagement openings to receive the support clamps to accommodate the support structure of a second width,
wherein the second engagement openings are spaced apart from one another by a greater amount than the first engagement openings.

9. The mounting bracket of claim 1, further comprising:
a mounting boss to attach the mounting bracket to a wall.

10. The mounting bracket of claim 1, wherein the engagement members of the support clamp assembly are engageable to the support structure that comprises a ceiling rail.

11. The mounting bracket of claim 1, wherein the engagement members of the device clamp assembly are moveable with respect to one another responsive to a toolless user-applied force.

12. The mounting bracket of claim 1, wherein the engagement members of the device clamp assembly comprise protruding tabs to engage slots of the device.

13. A mounting bracket comprising:
device clamps comprising engagement members moveable inwardly toward one another responsive to toolless user-applied forces to engage corresponding engagement members of a device;
clamp locks to lock the device clamps in position after the device clamps are engaged to the device;
a support clamp assembly comprising:
engagement members to engage a support structure to which the device is to mount; and
engagement gaps to engage the support structure after rotation of the mounting bracket from a first engaged position with respect to the support structure to a second engaged position with respect to the support structure; and
guide structures, each guide structure of the guide structures comprising an angled engagement surface and an aligned engagement surface;
wherein the angled engagement surfaces of the guide structures are engaged to sides of the support structure when the mounting bracket has the first engaged position; and
wherein the aligned engagement surfaces of the guide structures are engaged to the sides of the support structure after rotation of the mounting bracket from the first engaged position to the second engaged position with respect to the support structure.

14. A method comprising:
attaching a device clamp assembly of a mounting bracket to a device, the device clamp assembly comprising engagement members moveable with respect to one another to an engaged position that engages corresponding discrete engagement members of the device;
attaching a support clamp assembly of the mounting bracket to a support structure, the support clamp assembly comprising engagement members to engage the support structure to which the device is to mount; and engaging support clamps of the support clamp assembly in first engagement openings of the mounting brackets to accommodate a support structure of a first size, and engaging support clamps of the support clamp assembly in second engagement openings of the mounting bracket to accommodate a support structure of a second size different from the first size.

\* \* \* \* \*